(12) United States Patent
Iwase

(10) Patent No.: US 10,453,425 B2
(45) Date of Patent: Oct. 22, 2019

(54) INFORMATION DISPLAYING APPARATUS AND INFORMATION DISPLAYING METHOD

(71) Applicant: Sharp Kabushiki Kaisha, Osaka (JP)

(72) Inventor: Kayoko Iwase, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 15/972,113

(22) Filed: May 5, 2018

(65) Prior Publication Data

US 2018/0254021 A1 Sep. 6, 2018

Related U.S. Application Data

(63) Continuation of application No. 14/062,193, filed on Oct. 24, 2013, now Pat. No. 9,990,905.

(30) Foreign Application Priority Data

Nov. 1, 2012 (JP) .................................. 2012-241469

(51) Int. Cl.
*G09G 5/14* (2006.01)
*G06F 3/0481* (2013.01)
*G06F 3/0485* (2013.01)

(52) U.S. Cl.
CPC ............. *G09G 5/14* (2013.01); *G06F 3/0481* (2013.01); *G06F 3/0485* (2013.01); *G09G 2340/12* (2013.01); *G09G 2354/00* (2013.01)

(58) Field of Classification Search
CPC .. G09G 5/14; G09G 2354/00; G09G 2340/12; G06F 3/0485; G06F 3/0481
See application file for complete search history.

(56) References Cited

U.S. PATENT DOCUMENTS 5,404,442 A * 4/1995 Foster .................. G06F 3/0481
715/210
5,675,753 A * 10/1997 Hansen ...................... G06F 8/34
707/999.102

(Continued)

FOREIGN PATENT DOCUMENTS

JP 04-060589 A 2/1992
JP 10-198335 A 7/1998

(Continued)

OTHER PUBLICATIONS

Copy of Allowed Claims from U.S. Appl. No. 14/062,193, filed Oct. 24, 2013.

*Primary Examiner* — Stephen G Sherman
(74) *Attorney, Agent, or Firm* — Renner, Otto, Boisselle & Sklar, LLP

(57) ABSTRACT

Provided is an information displaying apparatus in which even when an image movement operation is received, it is possible to move an image excluding an image desired by a user. The apparatus is able to receive a predetermined selection movement operation for selecting a part or the whole of the image that is being displayed currently as an image to be moved for moving and a predetermined selection operation for selecting a part of the image that is being displayed currently as a movement prohibition image. When the predetermined selection movement operation is received in a state where the movement prohibition image is selected depending on the above-described predetermined selection operation, the apparatus executes display control to move the above-described image to be moved in a state where the above-described movement prohibition image is displayed at a current display position as it is.

8 Claims, 9 Drawing Sheets

(56) References Cited

U.S. PATENT DOCUMENTS

2003/0179214 A1* 9/2003 Saund .................. G06T 11/60
                                                                345/619
2004/0175764 A1   9/2004 Nishiyama et al.

FOREIGN PATENT DOCUMENTS

| JP | 2002-268617 A | 9/2002 |
| JP | 2004-213429 A | 7/2004 |
| JP | 2008-039813 A | 2/2008 |

* cited by examiner

INFORMATION DISPLAYING APPARATUS AND INFORMATION DISPLAYING METHOD

CROSS-NOTING PARAGRAPH

This non-provisional application is a continuation of U.S. patent application Ser. No. 14/062,193, filed on Oct. 24, 2013, and claims priority under 35 U.S.C. § 119(a) on Patent Application No. 2012-241469 filed in JAPAN on Nov. 1, 2012, the entire contents both of which are hereby incorporated herein by reference.

FIELD OF THE INVENTION

The present invention relates to an information displaying apparatus and an information displaying method.

BACKGROUND OF THE INVENTION

Conventionally, an information displaying apparatus which displays an image showing advertisement information, memo information and the like has been used. The information displaying apparatus also includes an apparatus called, what we call, an electronic blackboard apparatus provided with a display portion in a screen form and an input portion (operation portion) for receiving handwriting input on a screen of the display portion.

As to such an information displaying apparatus, Japanese Laid-Open Patent Publication No. 2002-268617 proposes a method in which lengthwise and crosswise scrolling buttons are operated for scrolling and moving display information which is displayed as well as displaying the display in a range which is not displayed. In addition, in Japanese Laid-Open Patent Publication No. 2002-268617, it is also proposed that by configuring in such a way as that lengthwise and crosswise scrolling is conducted page by page, an image for one screen is moved (that is, subjected to page turning/returning).

However, in a conventional technology starting from the technology described in Japanese Laid-Open Patent Publication No. 2002-268617, by a scrolling operation or a page switching (page turning/returning) operation, all images are moved. More specifically, description will be given for page turning processing in a conventional information displaying apparatus with reference to FIG. 1 and FIG. 2.

On an information displaying apparatus 100 shown in FIG. 1, an image 101 of a certain page is displayed, and this image 101 includes an image 101a showing character information of "Note: Bring gym uniform" or the like. When a page turning operation is received from a user in a state where such an image 101 is displayed, the information displaying apparatus 100 displays an image 102 of a next page as shown in FIG. 2 by page turning processing (scrolling processing page by page). Then, in the image 102, the image 101a existing in the previous page is subjected to page turning with an image of other character information and disappears from a display screen.

In this way, in the conventional technology, the image that is displayed is simply moved by scrolling, and even when information that is desired by the user to be remained on the screen even after scrolling exists, the scrolling is performed without taking over a description content of the previous page at all. Then, in order to confirm the above-described information from such a state, it is necessary to perform scrolling in an inverse direction such as performing page returning, thus causing inconvenience.

SUMMARY OF THE INVENTION

The present invention aims to provide an information displaying apparatus and an information displaying method in which even when an image movement operation such as a scrolling operation or a page switching operation is received, it is possible to move an image excluding an image desired by a user.

An object of the present invention is to provide an information displaying apparatus comprising: an operation portion for receiving a user operation, a display portion for displaying an image, and a display control portion for controlling display of the image on the display portion, wherein the operation portion is able to receive a predetermined selection movement operation for selecting and moving a part or all of an image that is being displayed currently as an image to be moved and a predetermined selection operation for selecting a part of the image that is being displayed currently as a movement prohibition image, and the display control portion, when the predetermined selection movement operation is received in a state where the movement prohibition image is selected depending on the predetermined selection operation, executes display control to move the image to be moved in a state where the movement prohibition image is displayed at a current display position as it is.

Another object of the present invention is to provide the information displaying apparatus, wherein the predetermined selection movement operation is a page switching operation or a scrolling operation.

Another object of the present invention is to provide the information displaying apparatus, wherein when the predetermined selection operation is received, the display control portion executes display control to change a display form of the image selected as the movement prohibition image from that before the selection.

Another object of the present invention is to provide the information displaying apparatus, wherein the predetermined selection operation is an operation for specifying a position of the image to be selected as the movement prohibition image by attaching a predetermined image at the position, and the display control portion selects an image of a predetermined range including the predetermined image attached as the movement prohibition image.

Another object of the present invention is to provide the information displaying apparatus, wherein the operation portion is able to receive an operation for removing the predetermined image, and when the operation for removing the predetermined image is received, the display control portion releases the selection of the movement prohibition image.

Another object of the present invention is to provide the information displaying apparatus, the information displaying apparatus as defined in claim 1, wherein the predetermined selection operation is an operation for attaching a predetermined image at a position of the image to be selected as the movement prohibition image and specifying a range so as to include the position, and the display control portion selects the image of the range as the movement prohibition image.

Another object of the present invention is to provide an information displaying method in an information displaying apparatus provided with an operation portion for receiving a user operation, a display portion for displaying an image, and a display control portion for controlling display of the image on the display portion, comprising: a first receiving step in which the operation portion receives a predetermined selection operation for selecting a part of an image that is being displayed currently as a movement prohibition image, a second receiving step in which the operation portion receives a predetermined selection movement operation for selecting and moving a part or the whole of the image that is being displayed currently as an image to be moved in a state where the movement prohibition image is selected depending on the predetermined selection operation, and a display control step in which when the predetermined selection movement operation is received at the second receiving step, the display control portion executes display control to move the image to be moved in a state where the movement prohibition image is displayed at a current display position as it is.

PREFERRED EMBODIMENTS OF THE INVENTION

Figure 1:
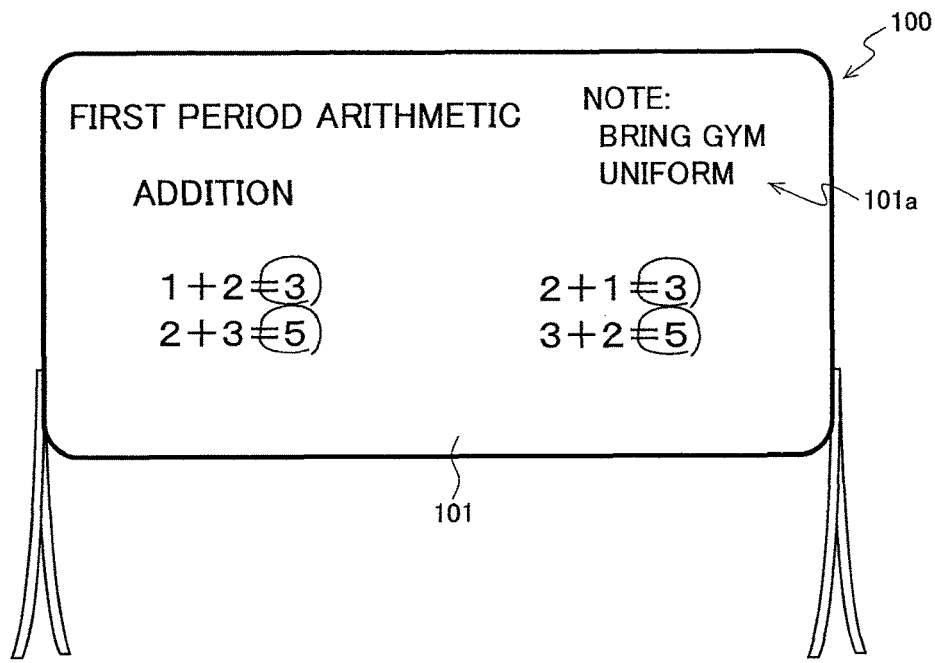
FIG. 1 is a view for explaining page turning processing in a conventional information displaying apparatus.
Figure 2:
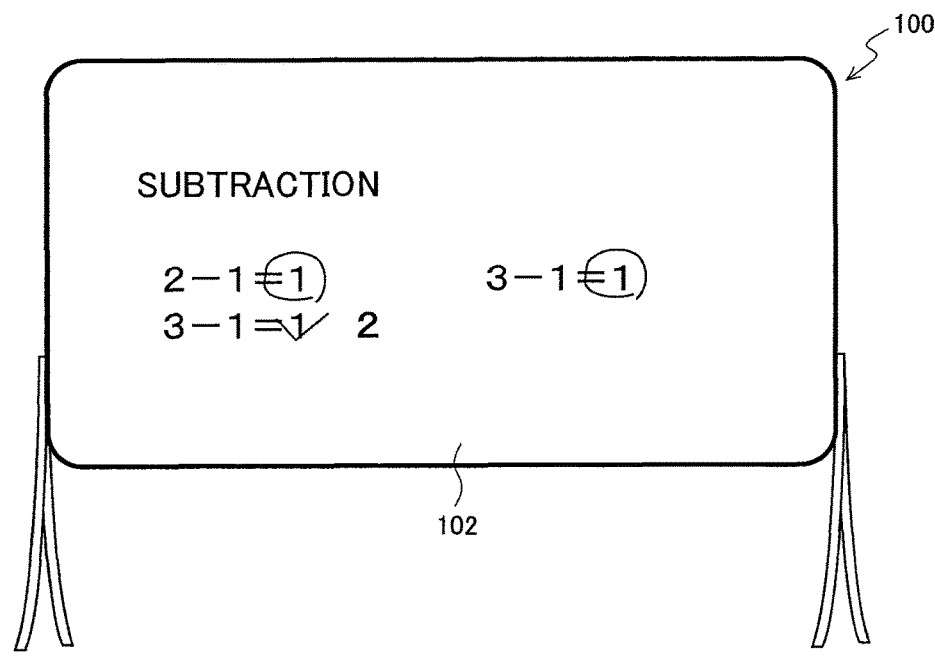
FIG. 2 is a view for explaining page turning processing in the conventional information displaying apparatus.
Figure 3:
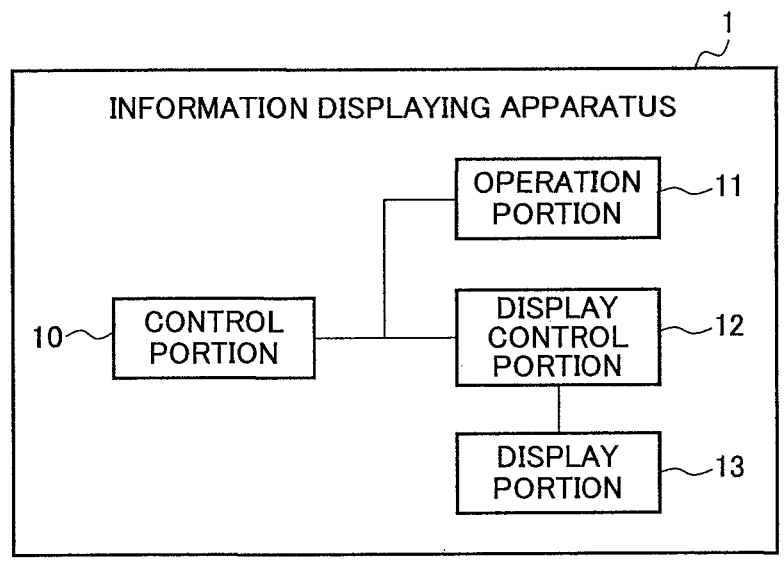
FIG. 3 is a view showing a configuration example of an information displaying apparatus according to the present invention.

FIG. 3 is a view showing a configuration example of an information displaying apparatus according to the present invention, and in the figure, the numerical symbol "1" denotes an information displaying apparatus (information display). The information displaying apparatus 1 is provided with a control portion 10 for controlling the whole thereof, an operation portion 11 for receiving a user operation, a display portion 13 for displaying an image, and a display control portion 12 for controlling display of an image on the display portion 13.

In order to control the whole of the information displaying apparatus 1, the control portion 10 consists of control devices such as a CPU (Central Processing Unit) or an MPU (Micro Processing Unit), a RAM (Random Access Memory) as a working area, and a storage device that stores a control program (including a program for performing information display processing while working with the operation portion 11 and the display control portion 12). The above-described program for performing the information display processing is able to include a GUI (Graphical User Interface) for prompting a user operation such as an input setting operation for performing setting in inputting information. Of course, a part or the whole of the control portion 10 can be composed of dedicated hardware.

The above-described storage device includes a flash ROM (Read Only Memory), an EEPROM (Electrically Erasable and Programmable ROM), a hard disc and the like. A file to be displayed in the information displaying apparatus 1 is also able to be saved in the above-described storage device. Note that, when the whole of the control portion 10 is composed of dedicated hardware, a storage device may be provided separately for saving a file.

The display portion 13 serves as a part for displaying an image, and is able to be composed of a display panel, for example, such as a liquid crystal display or an organic EL (electroluminescence) display. In the display portion 13 of the information displaying apparatus 1, not only an image showing information of characters, graphics and the like but also images of a picture, a moving image and the like are able to be displayed. Though detailed control will be described below, such display of images on the display portion 13 is to be controlled by the display control portion 12.

The operation portion 11 receives various user operations in the information displaying apparatus 1. The control portion 10 controls the whole of the information displaying apparatus 1 including the display control portion 12 so as to execute processing depending on the user operations. The user operations also include a user operation for inputting information, and the input information is provided to the display control portion 12 to be displayed on the display portion 13 by control of the display control portion 12.

Moreover, the input information is stored in an internal memory of the control portion 10 or the like for temporal saving, and is saved in the above-described storage device of the control portion 10 depending on the user operation or automatically. The input information is saved in the above-described storage device as a part of a file including at least an image that is being displayed currently, and is preferably saved as a part of a file including the image that is being displayed currently as a certain page. In addition, the user operation received by the operation portion 11 also includes a user operation for reading such a file, and when the reading operation is received by the operation portion 11, the control portion 11 detects it to provide the display control portion 12 with a part or the whole of the file to be read, so that the display control portion 12 causes the display portion 13 to display a part or the whole of the file.

Moreover, the operation portion 11 has an operation detection sensor such as a touch sensor being overlapped with or embedded in the above-described display panel, and may be configured so as to detect and receive a user operation by the operation detection sensor. In addition, the above-described program includes a handwriting input application in such a way as to perform drawing depending on the detected coordinates to carry out reflection in display on the display portion 13. With such a configuration, the information displaying apparatus 1 becomes possible to perform handwriting input and can function as a so-called electronic blackboard apparatus. Note that, the user operation such as an input setting operation may be received in a state where the above-described GUI image is displayed on the display panel.

Though description will be given below assuming that the information displaying apparatus 1 is able to perform handwriting input, that is, the information displaying apparatus 1 is an electronic blackboard apparatus, the operation portion 11 is also able to be configured to receive a user operation including an information input operation by a pointing device, a keyboard, or the like that is provided separately. Moreover, the information displaying apparatus 1 is not limited to be configured in an integral form, and is able to be composed of, for example, a PC (personal computer) and a display apparatus. In this case, the PC includes at least the control portion 10, the display apparatus includes at least the display portion 13, and functions of other components may be equipped in a dispersed manner on the side of the PC and the side of the display apparatus.

Note that, by including a communication portion such as a network adapter, for example, the information displaying apparatus 1 is able to be connected to a peripheral device such as a scanner apparatus, a printer apparatus or a multi-functional peripheral, by a wired/wireless network such as a LAN (Local Area Network), so that it is possible to cause the information displaying apparatus 1 to display image data read by the scanner apparatus and also to cause the printer apparatus or the multi-functional peripheral to print an image displayed on the information displaying apparatus 1.

With the configuration as described above, the information displaying apparatus 1 is able to receive a user operation to perform display depending on a content of the user operation. In addition, in the information displaying apparatus 1 of the present invention, it is possible to receive a predetermined selection movement operation, which will be described below, in the operation portion 11.

The above-described predetermined selection movement operation refers to an operation for selecting a part or all of an image that is being displayed currently on the display portion 13 as an image to be moved for moving, and refers to, for example, a scrolling operation or a page switching operation. However, the predetermined selection movement operation is not limited to the page switching operation or the scrolling operation. The page switching operation refers to a page turning operation or a page returning operation and is not limited to an operation for performing turning/returning by one page, and may be an operation for performing turning/returning by l/n page in which n is an integer of 2 or more, for example. Note that, performing the scrolling processing page by page corresponds to the page switching processing. Moreover, an image to be subjected to the scrolling operation or the page switching operation may be all or a part of the image that is being displayed currently on the display portion 13 as described above, and in the case of a part of the image, the remaining part (part which is not a target image to be moved) corresponds to, for example, a menu image of the handwriting input application or the like.

The scrolling operation or the page switching operation corresponds to an operation for touching an arbitrary position on the display screen of the display portion 13 to tap in a movement direction while keeping touching, an operation for selecting a button which is displayed so as to be selectable by a user as a GUI image, or the like. The button of the GUI image includes an up and down or a left to right scrolling button, a page turning button, a page returning button or the like.

The display control portion 12 executes display control for moving the image to be moved depending on the above-described predetermined selection movement operation, so that an image that was not displayed with the movement is displayed on the display portion 13. To explain more specifically, the display control portion 12 has an internal memory, so that an image of a screen for drawing which is larger than the display screen of the display portion 13 is able to be stored in the internal memory. In addition, depending on the image movement operation (the above-described predetermined selection movement operation) such as page switching or scrolling from the operation portion 11, the display control portion 12 extracts an image of a part to be output to the display screen (for example, a next page) from the stored image to be output to the display portion 13 for display.

Further, as one of main features of the present invention, the operation portion 11 is able to receive a predetermined selection operation described below. The predetermined selection operation refers to an operation for selecting apart of an image that is being displayed currently on the display portion 13 as a movement prohibition image, and may be an operation in which the above-described part is selectable for selecting the movement prohibition image by a predetermined method.

When the predetermined selection operation is received, the display control portion 12 selects the target image (the above-described part of the image that is being displayed currently) as the movement prohibition image. Here, when the predetermined selection operation is received, the display control portion 12 preferably executes display control to change a display form of the image selected as the movement prohibition image from a display form before the selection (such as by highlighting or surrounding with a frame). The change of the display form means to perform depiction differently between an image area selected as the movement prohibition image and other image area, and corresponds to processing of, for example, highlighting the former, surrounding the former image area with a frame, changing a background color of the former image area, or other processing. However, even when such reflection in the display form by the selection of the movement prohibition image is not performed, the following display control which is one of main features of the present invention is able to be realized when it is possible to identify that the selected image is in a state of being selected as the movement prohibition image differently from other area.

As one of main features of the present invention, when the above-described predetermined selection movement operation is received in a state where the movement prohibition image is selected depending on the above-described predetermined selection operation, the display control portion 12 executes display control to move the image to be moved in a state where the movement prohibition image is displayed at a current display position as it is (while leaving the movement prohibition image being displayed).

To explain the case of page turning or page returning, when an operation of page turning (or page returning) is received from a user, depending on the operation, the display control portion 12 typically performs control to switch the image that is being displayed currently on the display portion 13 to an image associated as a next page (or a previous page) of the image. However, when the operation of page turning or page returning is received in a state where the predetermined selection operation for selecting a part (partial area) of the image that is being displayed currently on the display portion 13 is received from the user, control is performed to switch to the image associated as a next page (or a previous page) with the movement prohibition image (above-described partial area) displayed.

To explain the case of scrolling, when the scrolling operation is received from a user, the display control portion 12 typically performs control to switch the image that is being displayed currently on the display portion 13 to a scrolled image. However, when the scrolling operation is received in a state where the predetermined selection operation for selecting apart of the image that is being displayed currently on the display portion 13 is received from the user, control is performed to switch an image of a remaining area to the scrolled image with the movement prohibition image (above-described partial area) displayed.

Moreover, in addition to the page switching operation and the scrolling operation, it is also possible to perform an operation for moving a partial area A (for example, a window a) of the image that is being displayed currently on the display portion 13 as a movement target. When such a user operation is performed that an area B (for example, a window b) that is displayed being overlapped with the window a is selected as the movement prohibition image to move the window a, the window a is moved while the window b remains as it is. In addition, when such a user operation is performed that an area C (for example, a window c) that is not overlapped with the window a is selected as the movement prohibition image to move the window a onto the window c, the window c remains as it is and the window a is displayed as its background.

With the display control as described above, even when the image movement operation such as the scrolling operation or the page switching operation is received, the information displaying apparatus 1 becomes possible to move the image with an image desired by the user which is excluded from the image to be moved. Therefore, when there is a part in which an item that is desired to be left is written, the user is able to exclude the part from the target of movement such as scrolling, and is able to display the part with the item written together with information that is displayed after movement by scrolling or the like.

Next, as a specific example, description will be given for information display processing (including information input processing) executed in the information displaying apparatus 1 which functions as an electronic blackboard apparatus equipped with a handwriting input application with reference to FIGS. 4 to 15.

Figure 4:
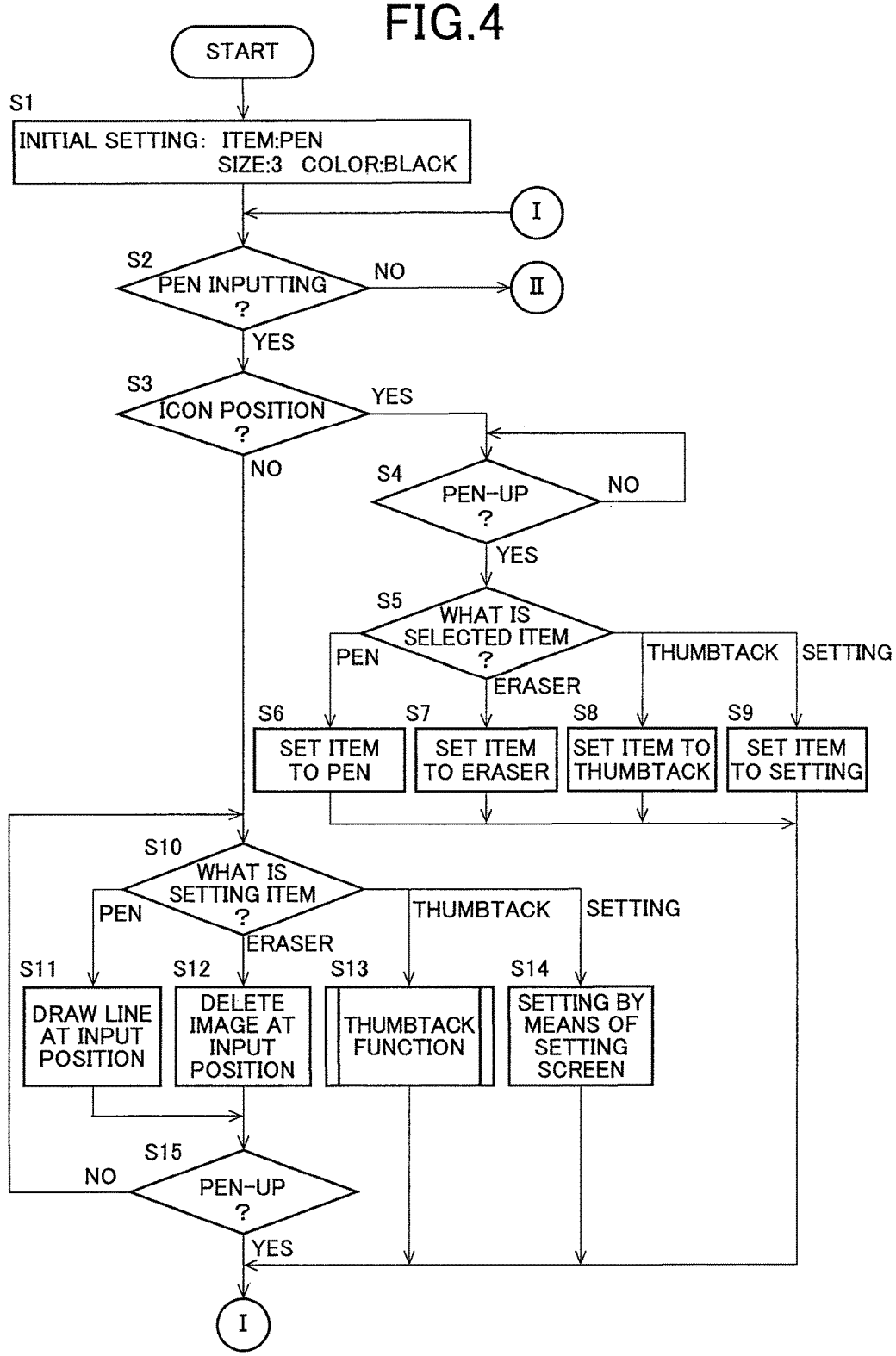
FIG. 4 is a flowchart for explaining an example of information display processing in the information displaying apparatus of FIG. 3.
Figure 5:
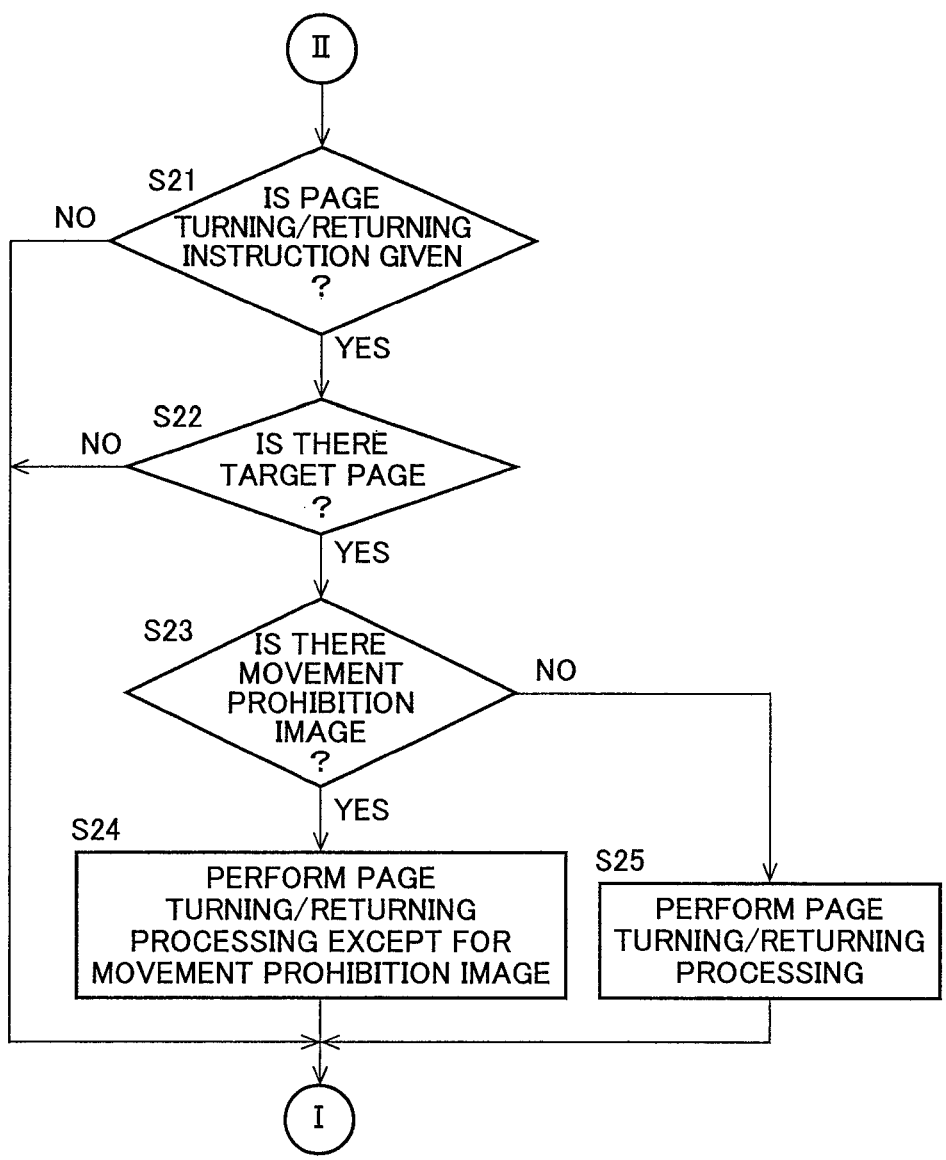
FIG. 5 is a flowchart subsequent to FIG. 4.
Figure 6:
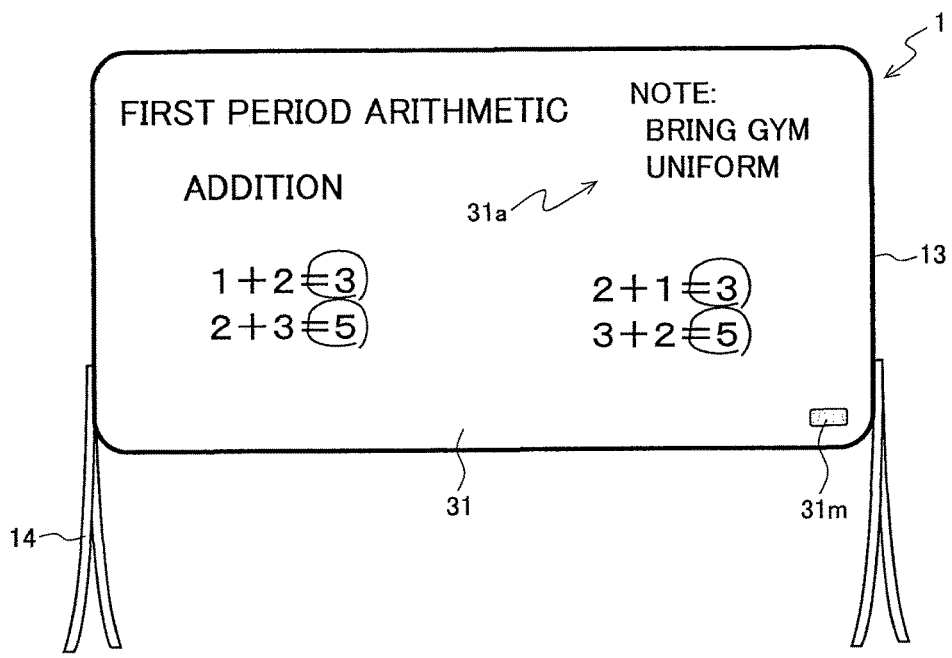
FIG. 6 is a view showing the situation where an image of a certain page is displayed in the information displaying apparatus of FIG. 3.
Figure 7:
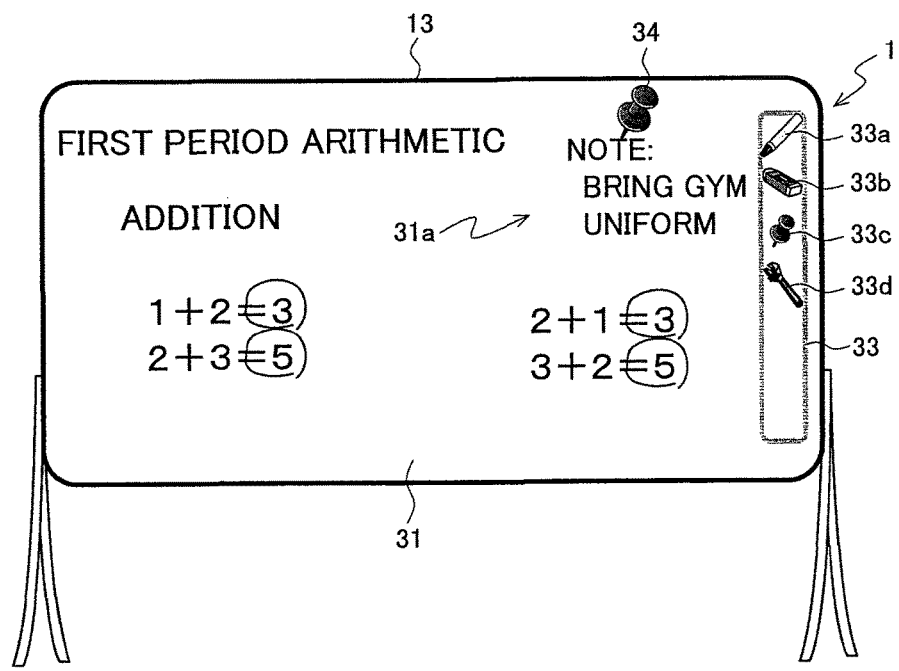
FIG. 7 is a view showing an example of the situation where a user opens a toolbar on a display screen from the display state of FIG. 6 to attach a thumbtack.
Figure 8:
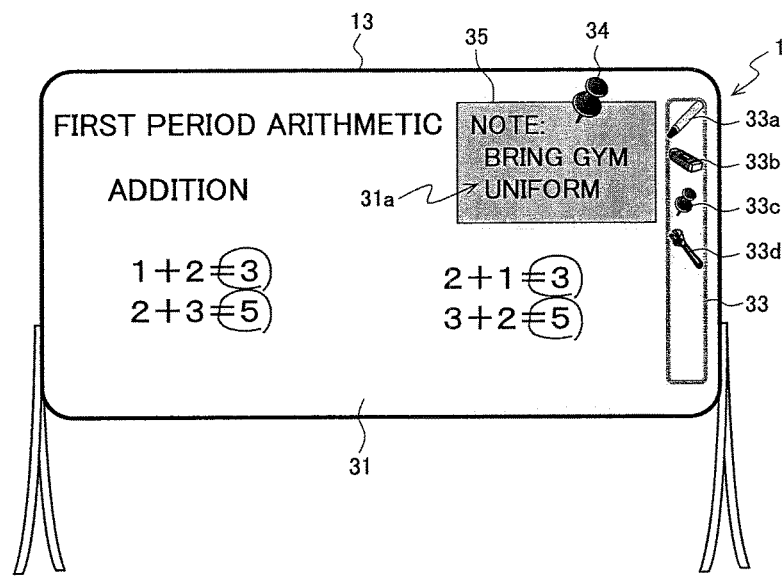
FIG. 8 is a view showing another example of the situation where the user opens the toolbar on the display screen from the display state of FIG. 6 to attach a thumbtack.
Figure 9:
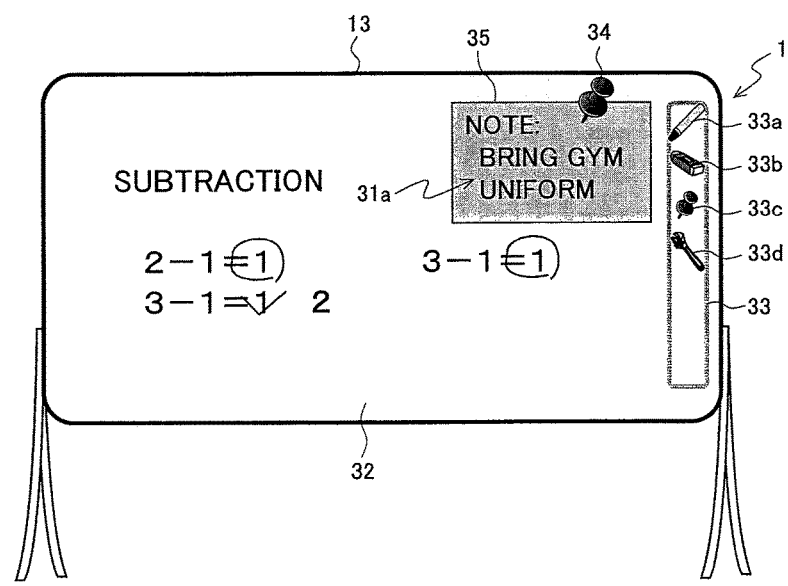
FIG. 9 is a view showing the situation where the user performs a page turning operation from the display state of FIG. 8.

FIG. 4 and FIG. 5 are flowcharts for explaining an example of the information display processing. Moreover, FIGS. 6 to 9 are views for explaining a usage example of a thumbtack function as a part of the information display processing. In particular, FIG. 6 is a view showing the situation where an image of a certain page is displayed in the information displaying apparatus of FIG. 3, FIG. 7 is a view showing an example of the situation where a user opens a toolbar on a display screen from the display state of FIG. 6 to attach a thumbtack, FIG. 8 is a view showing another example of the situation where a thumbtack is attached in this way, and FIG. 9 is a view showing the situation where the user performs a page turning operation from the display state of FIG. 8.

As shown in FIG. 6, such a case is assumed that an image 31 of a certain page is displayed on the display portion 13 of the information displaying apparatus 1, and this image 31 includes an image 31a showing character information of "Note: Bring gym uniform". Note that, the information including such character information may be all input by handwriting or may be displayed by reading a document file which is created in advance. Further, parts illustrated in printing type as exemplified in FIG. 6 (questions of arithmetic addition and answers from a certain answerer, as well as the image 31a) may be created as a document file, which is read and displayed, to be created by marking correct or incorrect of the answers by handwriting input.

In addition, a menu display button 31m for displaying a toolbar as a menu image by pop-up is also displayed in the image 31. When the user touches the menu display button 31m, a toolbar is displayed as shown in FIG. 7. In the toolbar 33 exemplified here, respective icons including a pen icon 33a, an eraser icon 33b, a thumbtack icon 33c and a setting icon 33d are displayed, so that the user is able to touch any one of the icons to thereby select processing corresponding to the touched icon. The toolbar 33 may be displayed from the beginning without disposing the menu display button 31m.

Description will be given below for an example of the information display processing along with the flow of FIG. 4 and FIG. 5 by taking a case where the toolbar 33 is originally displayed in this way as an example. Here, though description will be given for page turning/returning processing as an example, other image movement processing such as scrolling processing is also applicable in the same way.

First, the control portion 10 of the information displaying apparatus 1 activates a handwriting input application to perform initial setting (step S1). As the initial setting, for example, an item to be used is a pen (the item which is used when the above-described pen icon 33a is selected), its size (thickness) is "3" from 1 to 10 which can be set, for example, and a color of the pen is "black".

Next, the control portion 10 judges whether or not pen input (touching by a pen or finger) is performed (step S2), and in the case of being not performed (in the case of NO), causes the process to go to step S21 of FIG. 5 described below, and in the case of being performed (in the case of YES), judges whether or not the pen inputting is at an icon position (any position of the icons 33a to 33d) (step S3).

In the case of YES at step S3, the control portion 10 judges whether or not a pen-up is performed (touching by a pen or finger is released) (step S4) and waits for the pen-up. At a stage where YES is given at step S4, an item at a point where the pen-up is performed is judged (step S5). When the pen icon 33a is selected, that is, when the item is a pen, the control portion 10 sets the item to the pen (step S6) to go back to step S2. Similarly, when the eraser icon 33b is selected, that is, when the item is an eraser, the control portion 10 sets the item to the eraser (step S7) to go back to step S2. Similarly, when the thumbtack icon 33c is selected, that is, when the item is a thumbtack, the control portion 10 sets the item to the thumbtack (step S8) to go back to step S2. Similarly, when the setting icon 33d is selected, that is, when the item is a setting, the control portion 10 sets the item to the setting (step S9) to go back to step S2.

On the other hand, in the case of NO at step S3, the control portion 10 judges what item is set (step S10). When the item is set to the pen, the control portion 10 causes line to be drawn at a position (coordinates) where pen inputting is performed (step S11). Note that, actually, by detecting an input position at a predetermined time interval before the pen-up is performed, the line may be drawn so as to join a positional interval thereof. When the item is set to the eraser, the control portion 10 causes the image at the position where pen inputting is performed to be deleted (step S12). After the processing of steps S11 and 12, the control portion 10 judges whether or not the pen-up is performed (step S15), and in the case of YES, the process goes back to step S2, while in the case of NO, the process goes back to step S10. In this manner, by continuing to draw or delete the line till the pen-up is performed, in the case of the drawing, for example, it is possible to draw a circle showing that a correct answer is given in the formula "1+2=3", while in the case of the deleting, it is possible to continue to delete the image at the input position.

When the item is set to the thumbtack as a result of the judgment at step S10, the control portion 10 uses a thumbtack function for the input position (step S13) to go back to step S2. In addition, when the item is set to the setting, the control portion 10 causes a GUI image (not shown) on a setting screen of the control portion 10 to be displayed (step S14) to go back to step S2. Note that, the GUI image on the setting screen may be capable of selecting, for example, a color or thickness of the pen, and a setting content selected by the operation portion 11 may be saved in the internal memory of the control portion 10.

Description will be given for step S8 and step S13 with a specific example thereof. Description will be given for a case where information shown by the image 31a is desired to be left, as an example of a case where the user has an item desired to be left in the display screen. In this case, the user touches the thumbtack ion 33c at step S8 to go back to step S2, and touches the vicinity displaying the item that is desired to be left at step S2. With this state, it is possible to judge that the setting item is the thumbtack at step S10, and the process goes to step S13. At step S13, as shown in FIG. 7, a thumbtack icon 34 is attached at the position as a result thereof.

In this example, though the predetermined selection operation is an operation for attaching a predetermined image like the thumbtack icon 34 at a position of the image selected as the movement prohibition image for specifying, prohibition of movement may be specified after the predetermined image is selected as the predetermined selection operation. In addition, it is also possible to adopt an operation in such a way as that when a desired position is touched, a menu image is displayed to select thumbtack attaching therefrom.

At this stage, since the thumbtack icon 34 is only attached, the display control portion 12 is able to select the movement prohibition image by performing processing for selecting an image in a predetermined range including a predetermined image like the attached thumbtack icon 34 as the above-described movement prohibition image. Though how to determine the predetermined range will be described below with reference to FIGS. 12 to 15, the predetermined range may be determined automatically or manually. Here, description will proceed assuming that the predetermined range is determined as a rectangular range including the image 31a and the thumbtack ion 34.

Moreover, instead of the example of FIG. 7, as exemplified in FIG. 8, the display control portion 12 may change, in the case of receiving the above-described predetermined selection operation, a display form from a display form before the selection by changing a background color of the image selected as the movement prohibition image (that is, an application range of the thumbtack function) 35.

Next, description will be given for processing in the case of NO at step S2, that is, the case of being not pen inputting along with FIG. 5. In this case, the control portion 10 judges whether or not a page turning/returning instruction is given from the user (step S21), and in the case of YES, judges whether or not a page being a target of the instruction exists (step S22). In the case of NO at steps S21 and S22, the process goes back to step S2.

In the case of YES at step S22, the display control portion 12 judges whether or not there is a movement prohibition image (step S23). In the case of NO at step S23, the display control portion 12 executes page turning/returning processing for an entire image of a page that is displayed (step S25) to go back to step S2. Note that, by the processing of step S25, for example, only the image 32 of a next page like in FIG. 11, which will be described below, is displayed.

On the other hand, in the case of YES at step S23, that is, when the page turning/returning operation is received from the user in a state where the movement prohibition image is selected, the display control portion 12 executes page turning/returning processing except for the movement prohibition image (step S24) and goes back to step S2. To explain the page turning operation, at step S24, as exemplified in FIG. 9, page turning is performed for the images other than the image 31a and the image of the thumbtack icon 34, and the image 32 of the next page is displayed on the display portion 13. That is, the processing of step S24 results in the state where the thumbtack 31a and the image of the thumbtack icon 34 are displayed in a foreground of the image 32 of the next page.

Note that, while the movement prohibition image is consistently an image selected in the above-described predetermined selection operation by the user, the menu display button 31m and the toolbar 33 are images that are not included in the image to be moved and determined by the handwriting input application so as not to be moved originally, and do not correspond to the image selected by the above-described predetermined selection operation by the user.

Figure 10:
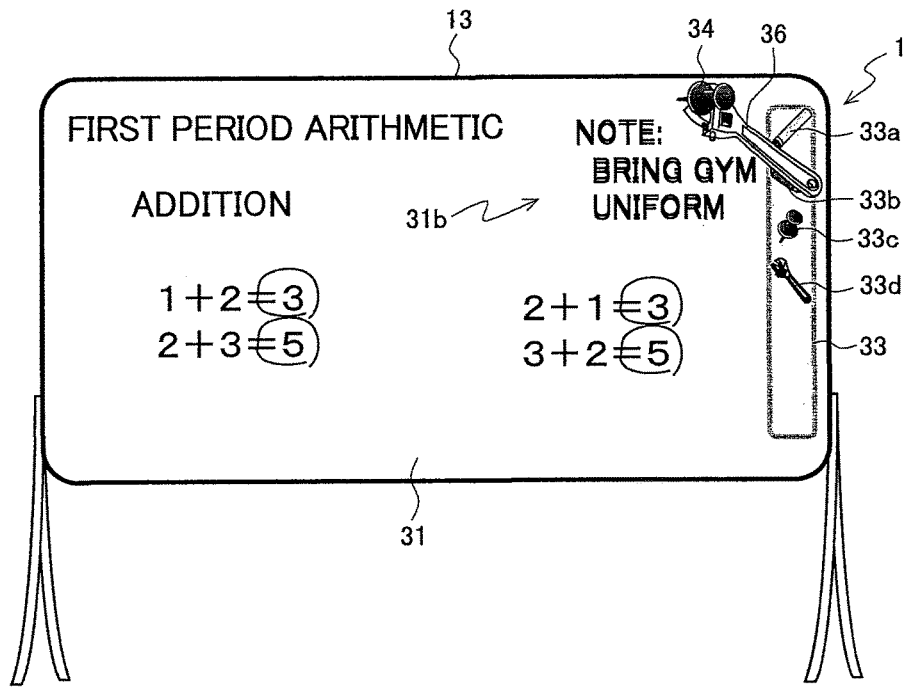
FIG. 10 is a view showing the situation where the user detaches the thumbtack on the display screen from the display state of FIG. 8.
Figure 11:
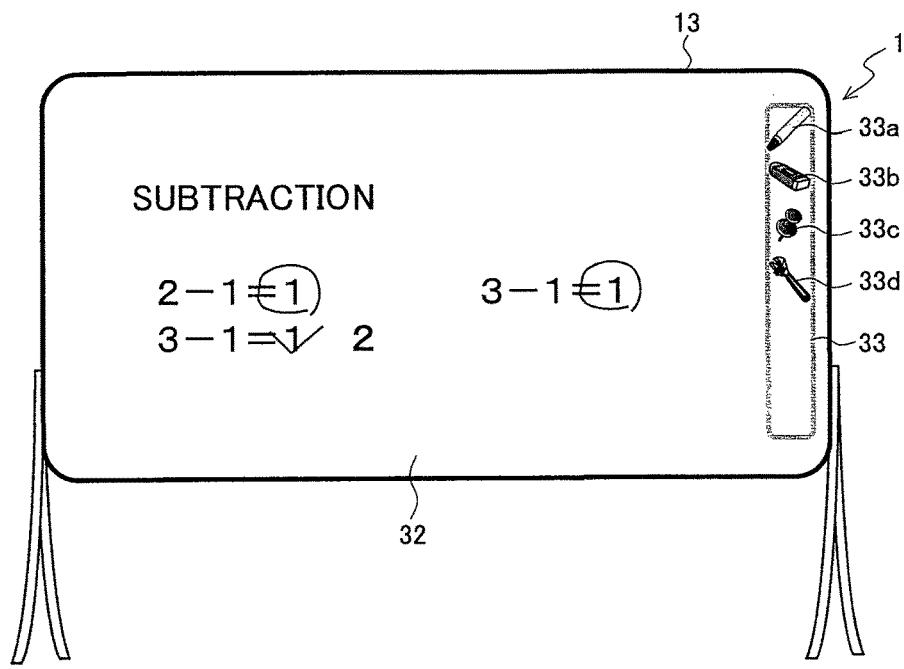
FIG. 11 is a view showing the situation where the user performs a page turning operation from the display state after the thumbtack is detached as shown in FIG. 10 and the detaching is completed.

Next, description will be given for an example of procedure for setting the thumbtack function off with reference to FIG. 10 and FIG. 11. FIG. 10 is a view showing the situation where the user detaches the thumbtack on the display screen from the display state of FIG. 8, and FIG. 11 is a view showing the situation where the user performs a page turning operation from the display state after the thumbtack is detached as shown in FIG. 10 and the detaching is completed.

The operation portion 11 is preferably able to receive an operation for removing the above-described predetermined image like the thumbtack icon 34 from the user. As the removing operation, for example, an operation for touching the target thumbtack icon 34 after touching the icon 33d for removing the thumbtack from the setting screen is able to be adopted. Other removing operations include a method for deleting the thumbtack icon 34 by touching the thumbtack icon 34 again, a method for dragging the thumbtack icon 34 to be moved to a trash icon which is not shown, and the like.

Immediately after such a removing operation is performed, the display control portion 12 may show the user that removing has been performed in an understandable way by displaying a setting icon 36 similar to the setting ion 33d at the position of the thumbtack icon 34 as well as displaying like the image 31b with an image which is obtained by slightly shifting the image 31*b* overlapped, as shown in FIG. 10. When the operation for removing the above-described predetermined image is received, the display control portion 12 then releases the selection of the above-described movement prohibition image (sets the thumbtack function off). That is, the selection of the movement prohibition image is released when the operation for removing the above-described predetermined image is received.

In addition, at a stage where the thumbtack function is set off or immediately after the removing operation is received as shown in FIG. 10, the background color of the application range (above-described predetermined range) of the thumbtack function is also preferably returned to an original background color. Note that, the thumbtack icon 34 is able to be attached at a plurality of positions, and even when removing, the selection may be released only for the movement prohibition image including the thumbtack icon 34 at the position where the removing operation is performed.

In this manner, when the predetermined selection movement operation is received after the thumbtack function is set off, the display control portion 12 may execute the processing of step S25 of FIG. 5, that is, display control to simply move the image to be moved. When the predetermined selection movement operation is page turning, only the image 32 of the next page is displayed on the display portion 13 as shown in FIG. 11.

Next, description will be given for how the display control portion 12 determines a predetermined range including a predetermined image like the attached thumbtack icon 34 with reference to FIGS. 12 to 15. When the movement prohibition image is determined upon determination of the predetermined range, it is preferable to change a display form such as by changing a background color as described above.

Figure 12:
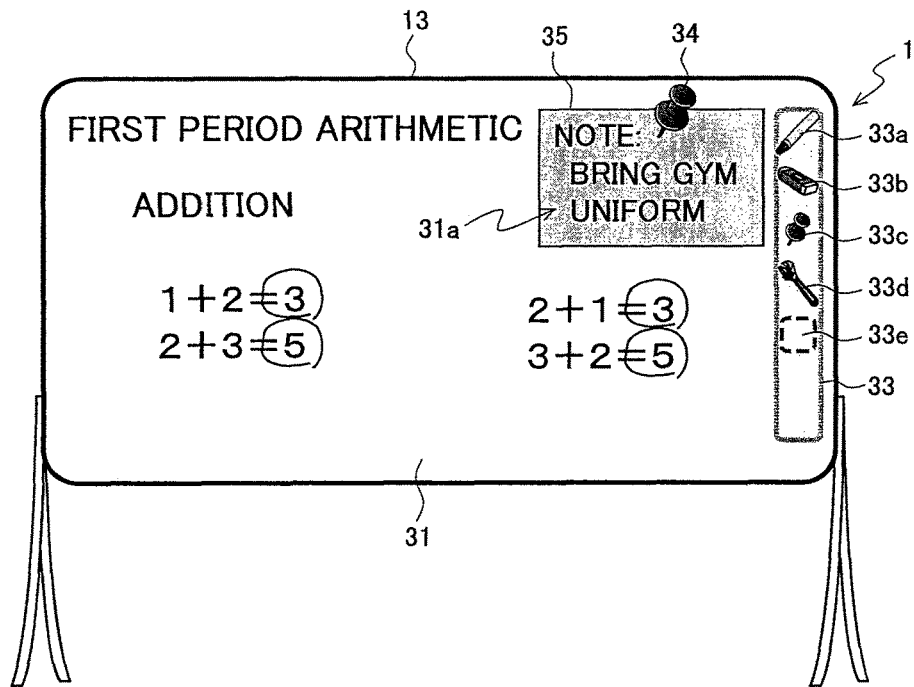
FIG. 12 is a view showing another example of the situation where the user opens the toolbar on the display screen from the display state of FIG. 6 to attach a thumbtack.

FIG. 12 is a view showing another example of the situation where the user opens the toolbar on the display screen from the display state of FIG. 6 to attach a thumbtack.

As a method for determining the movement prohibition image, it is preferable to adopt an automatic determining method as described below, but it is also possible to adopt a non-automatic determining method (that is, a manual determining method). Therefore, the application range (above-described predetermined range) may be displayed so that a user is able to select an icon 33*e* for specifying in the toolbar 33 as shown in FIG. 12. The icon 33*e* may adopt such a form that it is possible to recognize an icon for specifying a range by a dotted line frame or the like. In addition, by touching and dragging the icon 33*e* after the selection, the user is able to determine an arbitrary range as the application range manually. In this manner, by specifying with the thumbtack icon 34 after the application range is determined, an image of the application range is determined as the above-described movement prohibition image.

Moreover, as other manual determining method, it is possible to receive specification of an area (range specification) after the icon 33*e* is touched by providing only the icon 33*e* without providing the thumbtack icon 33*c* and determine the application range in the received range. In both determining methods, the predetermined selection operation corresponds to an operation for attaching the predetermined image at a position of the image selected as the movement prohibition image to specify a range so as to include the position, and the display control portion 12 selects an image of this range as the movement prohibition image automatically based on the operation for specifying the range.

Figure 13:
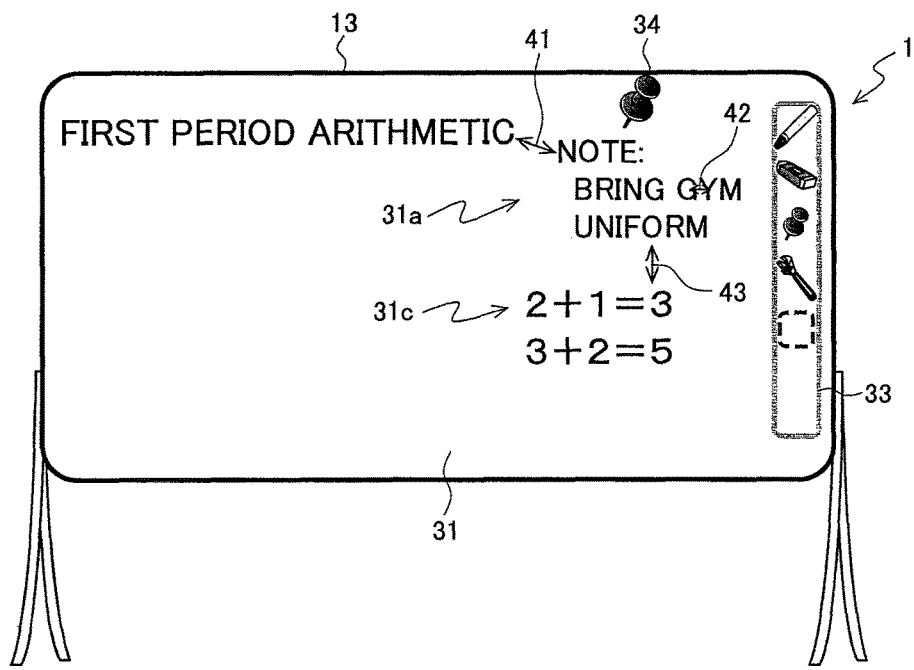
FIG. 13 is a view for explaining an example of a method for determining a range of a movement prohibition image when the user attaches a thumbtack on the display screen in the information displaying apparatus of FIG. 3.
Figure 14:
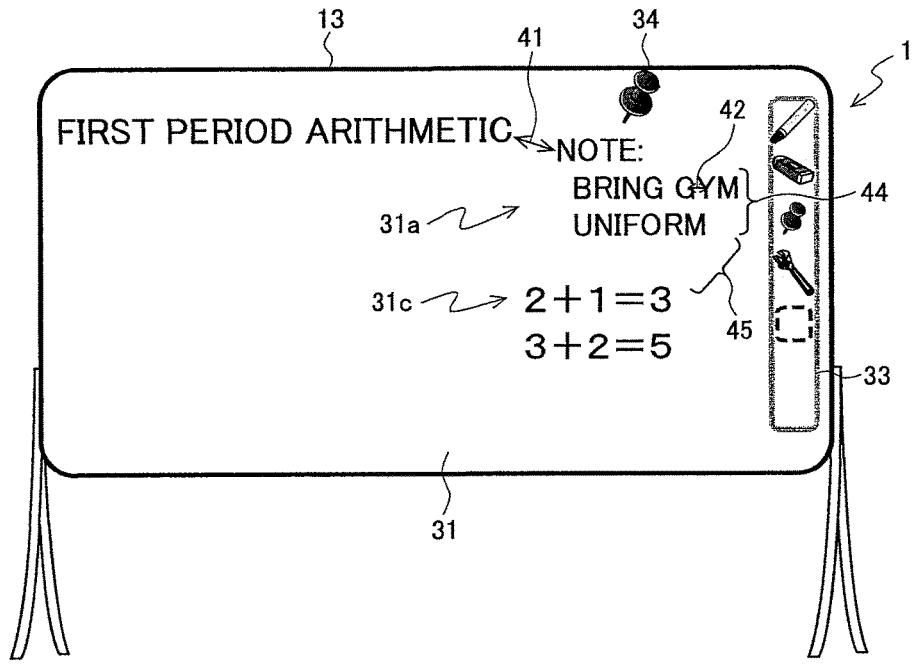
FIG. 14 is a view for explaining another example of the method for determining a range of a movement prohibition image when the user attaches a thumbtack on the display screen in the information displaying apparatus of FIG. 3.

Next, description will be given for the automatic determining method with reference to FIG. 13 and FIG. 14. FIG. 13 is a view for explaining an example of a method for determining a range of a movement prohibition image when the user attaches a thumbtack on the display screen like the display state of FIG. 7 in the information displaying apparatus of FIG. 3, and FIG. 14 is a view for explaining another example of this method.

The method for automatically determining an application range may be provided for searching an object such as characters and graphics existing around a position at which the thumbtack icon 34 is attached to determine a border from the search result. Here, the object such as characters and graphics may be input in handwriting. In addition, as such a determining method, for example, either a first determining method shown in FIG. 13 or a second determining method shown in FIG. 14 is able to be adopted.

First, description will be given for the first determining method with reference to FIG. 13.

Characters around the thumbtack icon 34 are searched and a nearest character "e" ("e" of "Note:") is found to measure an interval between the character and other character adjacent to the character. Such measurement of the interval is repeated to recognize a part where a character interval is larger than a predetermined value as a border. For example, such a case is assumed that an interval 42 is within the predetermined value, but an interval 41 between the image 31*a* and a character string of a title "First period arithmetic", and an interval 43 between the image 31*a* and the image 31*c* are larger than the predetermined value. In such a case, a border is provided between the interval 41 and the interval 43 without providing a border to the interval 42 to determine an application range.

Here, the control portion 10 performs processing assuming that the predetermined selection operation is an operation for specifying a position of an image selected as the movement prohibition image. Note that, instead of the above-described position, it is also possible to adopt a range selected in an area to be touched and dragged.

Next, description will be given for the second determining method with reference to FIG. 14.

Also in the second determining method, in the same manner as the first determining method, an interval between objects is obtained, and based on it, the application range, that is, the movement prohibition image is determined. The second determining method also includes judgment used when it is impossible to perform the determination only by the interval. In the second determining method, character recognition and semantic analysis are executed and whether or not front and back sentences make sense is judged to determine a point where the sentences make sense as the application range. For example, aline space 44 of FIG. 14 makes sense and is therefore not judged as a border, but a line sense 45 does not make sense and is therefore judged as a border.

Figure 15:
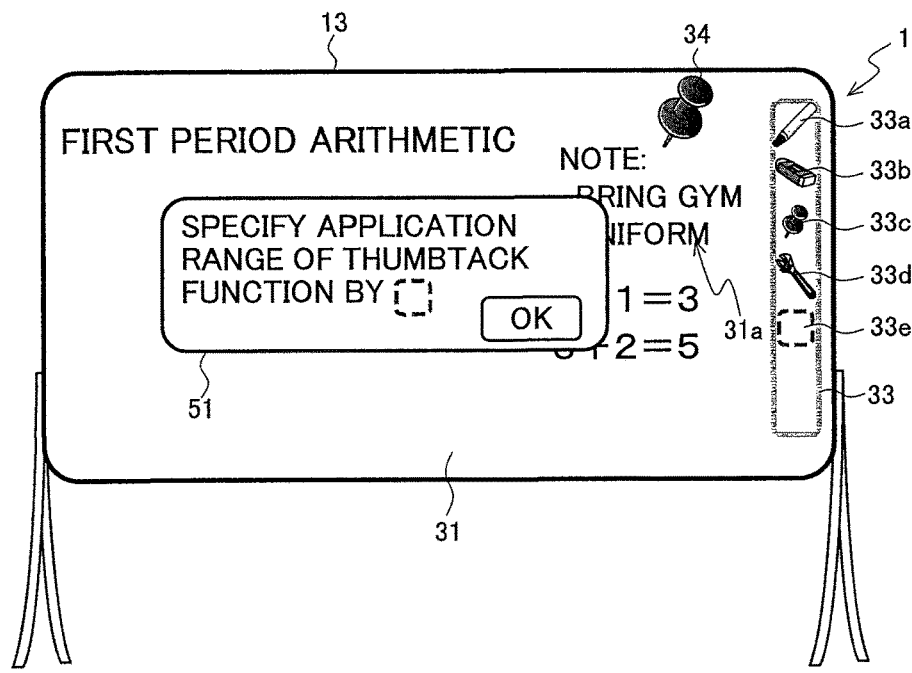
FIG. 15 is a view showing an example of a GUI image which is displayed in a case where it is impossible to determine a range of a movement prohibition image even when the user attaches a thumbtack on the display screen in the information displaying apparatus of FIG. 3.

Next, when the application range is not able to be determined automatically, the display control portion 12 may display a GUI image 51 exemplified in FIG. 15 so that the range is specified by the user as shown in FIG. 15.

Hereinbefore, though description has been given for the information displaying apparatus according to the present invention, as described for processing procedure thereof, the present invention also has a form as an information displaying method in the information displaying apparatus provided with an operation portion for receiving a user operation, a display portion for displaying an image, and a display control portion for controlling display of the image on the display portion.

This information displaying method has a first receiving step, a second receiving step and a display control step as follows. The first receiving step is a step in which the operation portion receives a predetermined selection operation for selecting a part of an image that is being displayed currently as a movement prohibition image. The second receiving step is a step in which the operation portion receives a predetermined selection movement operation for selecting a part or the whole of the image that is being displayed currently as an image to be moved for moving in a state where the above-described movement prohibition image is selected depending on the above-described predetermined selection operation. The display control step is a step in which when the above-described predetermined selection movement operation is received at the second receiving step, the display control portion executes display control to move the above-described image to be moved in a state where the movement prohibition image is displayed at a current display position as it is. Other applications and effects are as explained for the information displaying apparatus, and explanation of which will be thus omitted.

Moreover, the present invention can also employ a form as a program for causing a controlling device in the information displaying apparatus to execute the first receiving step, the second receiving step and the display control step in the above-described information displaying method (that is, a program that performs the above-described information display processing as exemplified with reference to FIG. 4 and FIG. 5). The program for performing the above-described information display processing is stored in a storage device of the control portion and read from the storage device for execution, so that the function according to the present invention is able to be realized.

In addition, the present invention can also employ a form as a computer-readable recording medium having these programs stored therein. The recording medium includes a portable recording medium such as a CD (Compact Disc), a DVD (Digital Versatile Disc), a BD (Blu-ray Disc), a Universal Serial Bus (USB: registered trademark) or the like. In this form, by reading the programs from the above-described recording medium by the controlling device for execution or by reading the programs from the above-described recording medium by the controlling device and storing them in the storage device of the controlling device to read them from the storage device for execution, the function according to the present invention is able to be realized.

Hereinabove, according to the present invention, in the information displaying apparatus, even when an image movement operation such as a scrolling operation or a page switching operation is received, it is possible to move an image excluding an image desired by a user.

The invention claimed is:

1. An information displaying apparatus comprising:
a display portion for displaying one or more images;
an operation portion for receiving a user operation; and
a display control portion for controlling display of the one or more images on the display portion, wherein
after receiving an operation for specifying a range on the display portion so as to include an image among the one or more images and an operation for attaching a thumbtack icon in the range while not changing a position of the image in the range,
when receiving an operation for moving the one or more images that are being displayed on the display portion, the display control portion moves the one or more images other than the image in the range in accordance with the operation for moving, without moving the image in the range.

2. The information displaying apparatus according to claim 1, wherein
when a page switching operation or a scrolling operation is received in a state where the thumbtack icon is attached in the range, the display control portion executes page switching processing or scrolling processing except for the movement prohibition image in the range.

3. The information displaying apparatus according to claim 1, wherein
the display control portion executes display control to change a display form of the image in the range from that before receiving the operation for attaching the thumbtack icon.

4. The information displaying apparatus according to claim 1, wherein
when processing for receiving the operation for specifying the range and the operation for attaching the thumbtack icon is not able to be performed, the display control portion causes the display portion to display a report image to select the range.

5. An information displaying apparatus comprising:
a display portion for displaying one or more images;
an operation portion for receiving a user operation; and
a display control portion for controlling display of the one or more images on the display portion, wherein
after receiving an operation for specifying an image area on the display portion so as to include an image among the one or more images and an operation for attaching a thumbtack icon in the image area while not changing a position of the image in the image area,
when receiving an operation for moving the one or more images that are being displayed on the display portion, the display control portion moves the one or more images other than the image in the image area in accordance with the operation for moving without moving the image in the image area.

6. The information displaying apparatus according to claim 5, wherein
the image area is a partial area of an image that is being displayed on the display portion.

7. The information displaying apparatus according to claim 5, wherein
the image area is a window.

8. An information displaying method comprising:
a step in which one or more images are displayed;
a step in which a user operation is received; and
a step in which display of the one or more images on the display portion is controlled, wherein
at the step in which the display is controlled, after receiving an operation for specifying an image area on the display portion so as to include an image among the one or more images and an operation for attaching a thumbtack icon in the image area while not changing a position of the image in the image area,
when receiving an operation for moving the one or more images that are being displayed on the display portion, the one or more images other than the image in the image area are moved in accordance with the operation for moving, without moving the image in the image area.

* * * * *